United States Patent
Ferrucci et al.

(10) Patent No.: US 9,015,031 B2
(45) Date of Patent: Apr. 21, 2015

(54) PREDICTING LEXICAL ANSWER TYPES IN OPEN DOMAIN QUESTION AND ANSWERING (QA) SYSTEMS

(75) Inventors: David A. Ferrucci, Yorktown Heights, NY (US); Alfio M. Gliozzo, New York, NY (US); Aditya A. Kalyanpur, Westwood, NJ (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 13/552,260

(22) Filed: Jul. 18, 2012

(65) Prior Publication Data
US 2013/0035930 A1    Feb. 7, 2013

Related U.S. Application Data

(60) Provisional application No. 61/515,091, filed on Aug. 4, 2011.

(51) Int. Cl.
*G10L 15/00*    (2013.01)
*G06F 17/27*    (2006.01)
*G06F 17/30*    (2006.01)

(52) U.S. Cl.
CPC ...... *G06F 17/2785* (2013.01); *G06F 17/30976* (2013.01)

(58) Field of Classification Search
None
See application file for complete search history.

(56) References Cited

U.S. PATENT DOCUMENTS

| | | | |
|---|---|---|---|
| 5,966,686 A | 10/1999 | Heidorn et al. | |
| 6,076,088 A | 6/2000 | Paik et al. | |
| 7,398,201 B2 * | 7/2008 | Marchisio et al. | 704/9 |
| 7,917,497 B2 * | 3/2011 | Harrison et al. | 707/713 |
| 8,676,820 B2 * | 3/2014 | Vailaya et al. | 707/755 |
| 2003/0233224 A1 * | 12/2003 | Marchisio et al. | 704/4 |
| 2010/0235164 A1 | 9/2010 | Todhunter et al. | |

OTHER PUBLICATIONS

Deerwester et al., "Indexing by Latent semantic Analysis", Journal of the American Society for Information Science, 41 (6): 391-407, 1990.

Fan et al., "PRISMATIC: Inducing Knowledge from a Large Scale Lexicalized Relations Resource", Proceeding of the NAACL HLT 2010, First International Workshop on Formalisms and Methodology for Learning by Reading, pp. 122-127, Jun. 2010.

Harabagiu et al., "Answering Complex Questions with Random Walk Models", SIGIR'06, Aug. 6-11, 2006, Seattle, WA, pp. 220-227.

Hartrumpf, "Semantic Decomposition for Question Answering", Proceedings of teh 18th European Conference on Artificial Intelligence (ECAI) (edited by Ghallab, Malik; Constantine D. Spyropoulos; Nikos Fakotakis; and Nikos Avouris), pp. 313-317, Patras, Greece (2008).

(Continued)

*Primary Examiner* — Daniel D Abebe
(74) *Attorney, Agent, or Firm* — Scully, Scott, Murphy & Presser, P.C.

(57) ABSTRACT

In an automated Question Answer (QA) system architecture for automatic open-domain Question Answering, a system, method and computer program product for predicting the Lexical Answer Type (LAT) of a question. The approach is completely unsupervised and is based on a large-scale lexical knowledge base automatically extracted from a Web corpus. This approach for predicting the LAT can be implemented as a specific subtask of a QA process, and/or used for general purpose knowledge acquisition tasks such as frame induction from text.

17 Claims, 8 Drawing Sheets

(56) References Cited

OTHER PUBLICATIONS

Hartrumpf et al., "University of Hagen at QA @ CLEF 2008: Efficient Question Answering with Question Decomposition and Multiple Answer Streams", Intelligent Information and Communication Systems (IICS), University of Hagen (FernUniversitat in Hagen) Hagen, Germany (2007).

Hearst, "Automatic Acquisition of Hyponyms from Large Text Corpora". Proc. of Coling-92. Nantes. Aug. 23-28, 1992., pp. 539-545.

Katz et al., "Syntactic and Semantic Decomposition Strategies for Question Answering from Multiple Resources". Proceedings of the AAAI 2005 Workshop on Inference for Textual Question Answering, pp. 34-41.

Lacatusu et al., Lite-GISTexter at DUC 2005, Language Computer Corporation, Richardson, TX, in DUC 2005.

Lin et al., "An Analysis of Multi-Focus Questions", Proceedings of the SIGIR 2008 Workshop on Focused Retrieval, pp. 30-36.

Prager et al., "Question Answering using Constraint Satisfaction: QA-by-Dossier-with-Constraints", ACL pp. 574-581 (2004).

Saquete et al., "Enhancing QA Systems with Complex Temporal Question Processing Capabilities", Journal of Artificial Intelligence Research 35 (2009) pp. 775-811.

Saquete et al., "Splitting Complex Temporal Questions for Question Answering systems", ACL (Ed.), 42nd Annual Meeting of the Association for Computational Linguistics, (2004) pp. 556-573.

\* cited by examiner

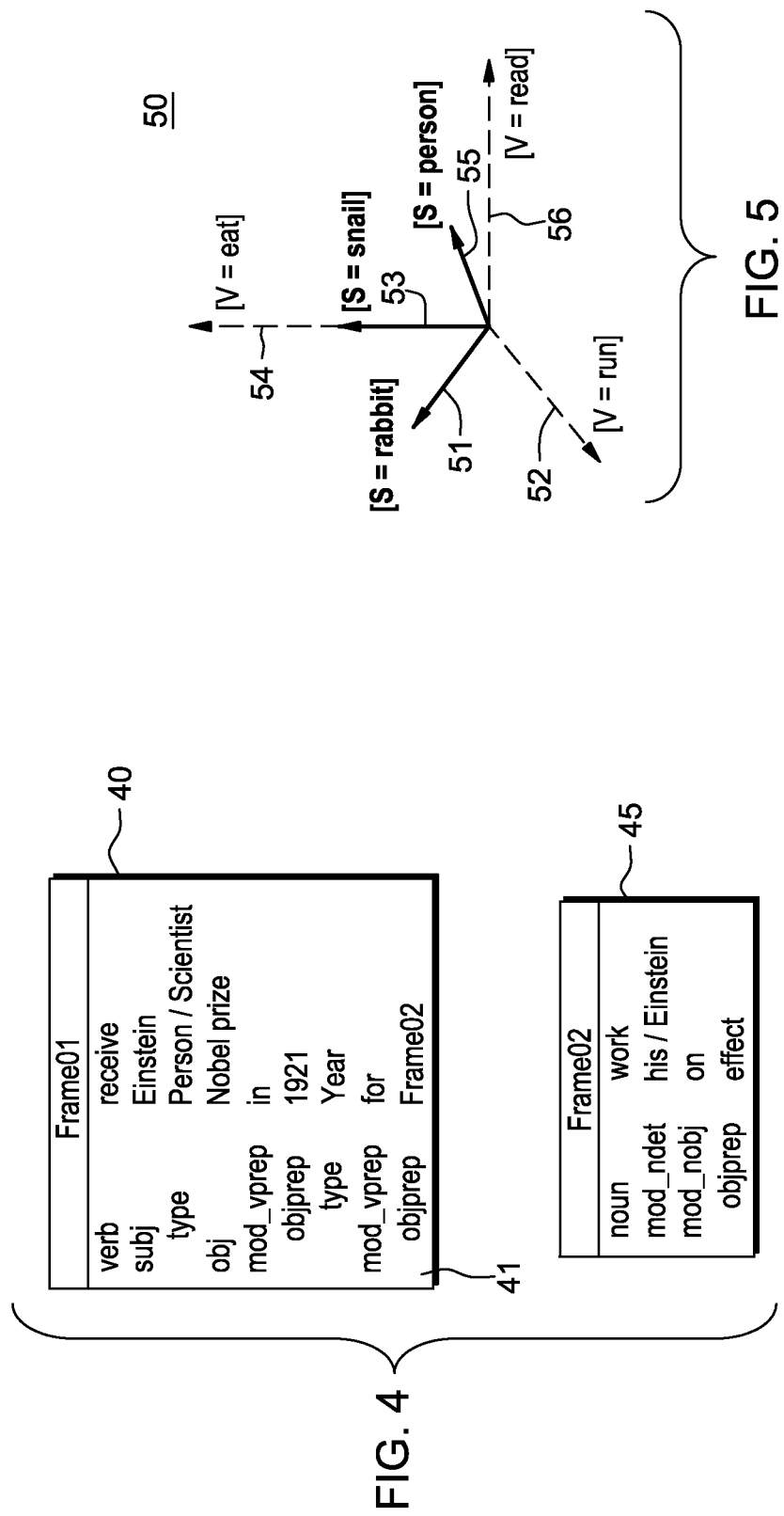

PREDICTING LEXICAL ANSWER TYPES IN OPEN DOMAIN QUESTION AND ANSWERING (QA) SYSTEMS

CROSS-REFERENCE TO RELATED APPLICATIONS

This application claims priority under 35 U.S.C. §119(e) of U.S. Provisional Patent Application Ser. No. 61/515,091, filed Aug. 4, 2011, the disclosure of which is hereby incorporated by reference in its entirety.

BACKGROUND

The invention relates generally to information retrieval systems, and more particularly, the invention relates to predicting lexical answer types to questions posed in a query/answer (QA) system and method for open domains.

DESCRIPTION OF THE PRIOR ART

Question answering research attempts to deal with a wide range of question types including: fact, list, definition, how, why, hypothetical, semantically-constrained, and cross-lingual questions. Search collections vary from small local document collections, to internal organization documents, to compiled newswire reports, to the World Wide Web.

Closed-domain question answering deals with questions under a specific domain (for example, medicine or automotive maintenance), and can be seen as an easier task because natural language processing (NLP) systems can exploit domain-specific knowledge frequently formalized in ontologies. In contrast, open-domain question answering deals with questions from any domain, and can only rely on general ontologies and world knowledge. On the other hand, these systems usually have much more data available from which to extract the answer.

Open domain question answering is a long standing research problem that has been pursued for decades. Among the problems facing open domain question answering is determining a lexical type that identifies the correct answer to the question. In some cases an answer type is explicit in the question; however, in other cases the answer type is not explicit. In those cases where the answer type is not explicit, a human might be able to infer a correct lexical answer type from the question. However, the ability for a machine to infer a lexical answer type from the question is a significant technical hurdle that is currently being researched. While existing solutions attempt to determine lexical answer types through question classification schemes, this type of solution is limited to a certain set of lexical types and not sufficient for open domain question answering. There is a need to develop a better solution to determining lexical answer types to questions in an open domain.

SUMMARY

A system, method and computer program product addresses the needs described above by providing an unsupervised approach to question lexical answer type prediction for use in an open domain QA system.

In one aspect, the unsupervised approach does not require any predefined type system.

In a further aspect, the system, method and computer program product is based on a large scale lexical knowledge base automatically extracted from the web.

In one embodiment, there is provided a computer-implemented method of inferring a lexical answer type from a question. The method comprises: extracting at least one syntactic frame from a question string; and querying a lexical knowledge database to obtain at least one replacement term for a focus of the at least one syntactic frame, wherein the focus is a part of the question indicating a lexical answer type to the question.

In a further embodiment, there is provided a system for predicting a lexical answer types (LAT) in a question comprising: a memory storage device including a plurality of syntactic frames; a processor device operatively connected to the memory storage device and configured to: receive a question text string; extract at least one syntactic frame from the question string, designate, in the syntactic frame, a placeholder for an entity corresponding to a potential lexical answer type; and query a lexical knowledge database to automatically obtain at least one replacement term for the placeholder of the at least one syntactic frame, wherein the entity placeholder is a part of a question focus indicating a LAT of the question.

In a further aspect, there is provided a system, method and computer program product for predicting a lexical answer types (LAT) in a question, wherein the method comprises: applying a frame-extraction utility to a question text to identify all frames involving a question focus, each frame having one or more slots-value pairs with a slot representing a syntactic role identified by a dependency relation, and including a question focus slot; for each identified frame, creating a query frame structure having a focus slot variable, for each query frame structure, finding in a data corpus, a slot filler for the focus slot variable, the slot filler being part of a question focus from which the LAT is determined, wherein a programmed processor device performs one or more of the applying, creating, and finding.

Further to this aspect, the method further comprises: obtaining a score associated with each the slot filler found for each identified frame, ranking the slot fillers according to the scores; and selecting a top-ranked slot filler as a predicted LAT to the question.

In a further aspect, the data corpus includes frame structures identified from a corpus of text, a frame structure having one or more slots-value pairs, a slot representing a syntactic role identified by a dependency relation, wherein the finding a slot filler comprises: specifying a frame cut comprising a sub-set of frames having non-empty slot-values for a given subset of slot-values pairs; specifying a frame abstraction to determine a desired relationship among selected selected slot values from the given subset of slot-values pairs; generating, from the frame cut, plural frame vectors defining a multi-dimensional vector space from which relationships among selected selected slot values is determined; and, processing the frame vectors to determine the desired relationship among selected selected slot values as defined by the abstraction.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The objects, features and advantages of the invention are understood within the context of the Detailed Description, as set forth below. The Detailed Description is understood within the context of the accompanying drawings, which form a material part of this disclosure, wherein:

FIG. 4 depicts Tables 40, 45 corresponding to the example Frames 01 and 02 extracted from an example dependency parse tree 30 corresponding to the example sentence 35 of FIG. 3;

FIG. 5 represents an example FV space 50 of frame vectors from the perspective of the verbs they can be subject_of (i.e., from the Verb cut) in one embodiment;

DETAILED DESCRIPTION

Figure 1:
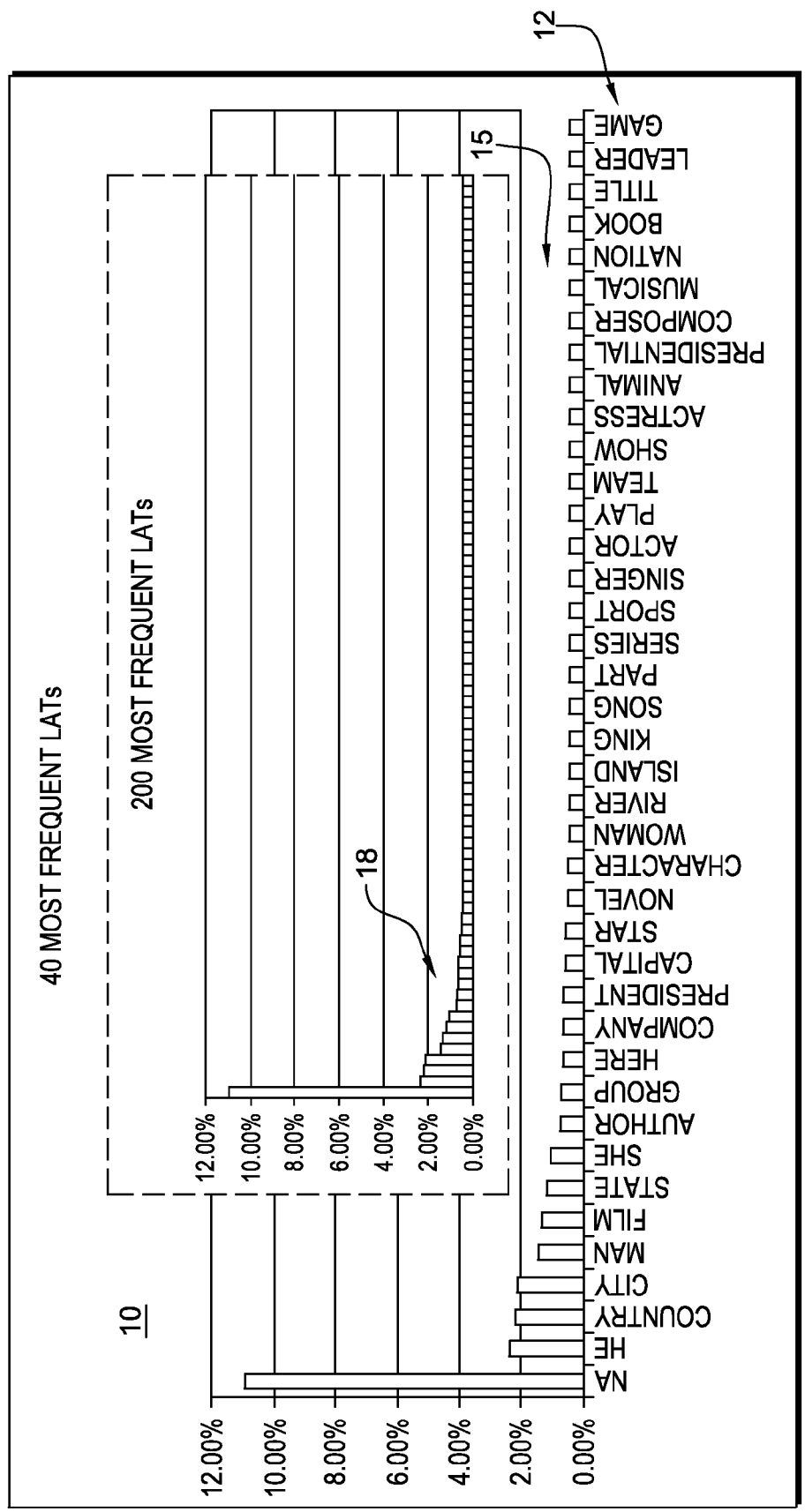
FIG. 1 depicts results 10 of analyzing a random sample of 20,000 example questions extracting the lexical answer type (LAT) 12 when present in an example embodiment.

As referred to herein, a lexical answer type, or "LAT", is a word in or a word inferred from the clue (e.g., question) that indicates the type of the answer, independent of assigning semantics to that word. For example, in the clue " . . . Invented in the 1500s to speed up the game, this maneuver involves two pieces of the same color . . . ", the LAT is the string "maneuver". Determining whether or not a candidate answer can be considered an instance of the LAT is an important kind of scoring and a common source of critical errors. In an embodiment of the present invention, this capability is implemented by a component called TyCor (short for Type Coersion) scoring, whose goal is to estimate the extent to which an entity can be coerced into (or matched with) a specific LAT. Functionally, TyCor scoring takes as input any two English terms (the first representing the LAT, the second being the answer candidate) and returns a numeric value.

In a QA system, such as described below with respect to FIG. 8, as part of an answer scoring function, programmed processing components automatically receive as inputs at an evidence gathering and answer scoring function 250: a LAT representing a text string describing some concept; and a "candidate answer" 248 representing a text string describing a possible answer to the question. The programmed processing components generate an output including a judgment (e.g., a score) representing to what degree the entity is an instance of the LAT concept. This process is more fully described in co-pending U.S. patent application Ser. No. 12/126,642, incorporated herein by reference.

More particularly, the LAT is extracted by a question analysis component as part of the "focus". The focus is the part of the question that, if replaced by the answer, makes the question a standalone statement. As an example, in the statement, "This drug has been shown to relieve the symptoms of ADD with relatively few side effects", the focus is "this drug" and in the statement, " . . . This title character was the crusty and tough city editor of the Los Angeles Tribune" the focus is "this title character." The focus often, but not always, contains the LAT (drug and title character in the examples). On the other hand, in many cases it is not possible to infer a meaningful LAT from the focus. For example, in the statement, "Secretary Chase just submitted this to me for the third time; guess what, pal. This time I'm accepting it," the focus is the first "this" so the LAT cannot be assigned.

After question analysis, a set of possible answers is generated by using information retrieval techniques. A key step in managing the recall versus precision trade-off is the application of lightweight (i.e. less resource intensive) scoring algorithms to this larger set of initial candidates to prune them down to a smaller set of candidates before the more intensive scoring components see them (i.e. soft filtering). There TyCor plays a crucial role, because it measures the likelihood of a candidate answer being an instance of the LAT. In a similar way, TyCor plays a crucial role in the QA scoring module, generating features used in the regression model that assigns answer confidence.

Inferring the correct LAT is then crucial for QA systems. FIG. 1 depicts results 10 of analyzing a random sample of 20,000 example questions extracting the LAT 12 when present. The distribution 10 of LATs 12 has a very long tail 15, as shown in FIG. 1, where the relative frequency of LATs is reported. The analysis found 2500 distinct and explicit LATs in the 20,000 example question sample. As shown in the insert portion of the results, the most frequent 200 explicit LATs 18 cover less than 50 percent of the data.

This aspect of the challenge implies that while task-specific type systems or manually maintained data would have some impact if focused on the head of the LAT curve, it still leaves more than half the problems unaccounted for. It makes the notion of LAT crucial, since it allows for addressing the long tail issue much better than any fixed type system. Moreover, the end-to-end QA accuracy of the system on questions without an assigned LAT is approximately 20% below the accuracy on questions with LATs. Thus, accurate LAT detection can have a major impact on a QA system such as implemented in IBM's Watson system.

The problem of inferring the LAT on this class of questions is addressed by first extracting a set of "syntactic frames" containing the focus. Those frames are grammatical structures, such as Subject Verb Object (SVO), containing the focus as one of their arguments. Then, there are inferred types for each slot by looking for similar frames in a large scale lexical knowledge base, perhaps automatically extracted from the web. In the instant project, the large scale lexical knowledge base is IBM's PRISMATIC or PRISMATIC KB (knowledge base system). However, other large scale lexical knowledge bases can be used. The retrieved frames from PRISMATIC include a set of terms in the position of the focus. From the analysis of those frames there is generalized a set of possible types that are returned as an output.

For example, from the question: "This drug has been shown to relieve the symptoms of ADD with relatively few side effects," the method includes extracting the following two syntactic frames: (focus, relieve, symptom) (SVO frame 1) and (focus, has, effect) (SVO frame 2).

Querying the PRISMATIC knowledgebase in order to get terms fitting the focus in those contexts, there is obtained the following two lists of terms: treatment, drug, it, medication, oxide (for SVO frame 1) and change, drug, decision, action, law (for SVO frame 2).

The union of the two lists is a set of words from which there is inferred a common type. To this aim, the method exploits an ISA (or is_a) cut of PRISMATIC containing associations between terms and LATs extracted from text mining. The solution is further enhanced using Latent Semantic Analysis (LSA) to measure the topical similarity between the inferred LAT and the context of the question.

Figure 2:
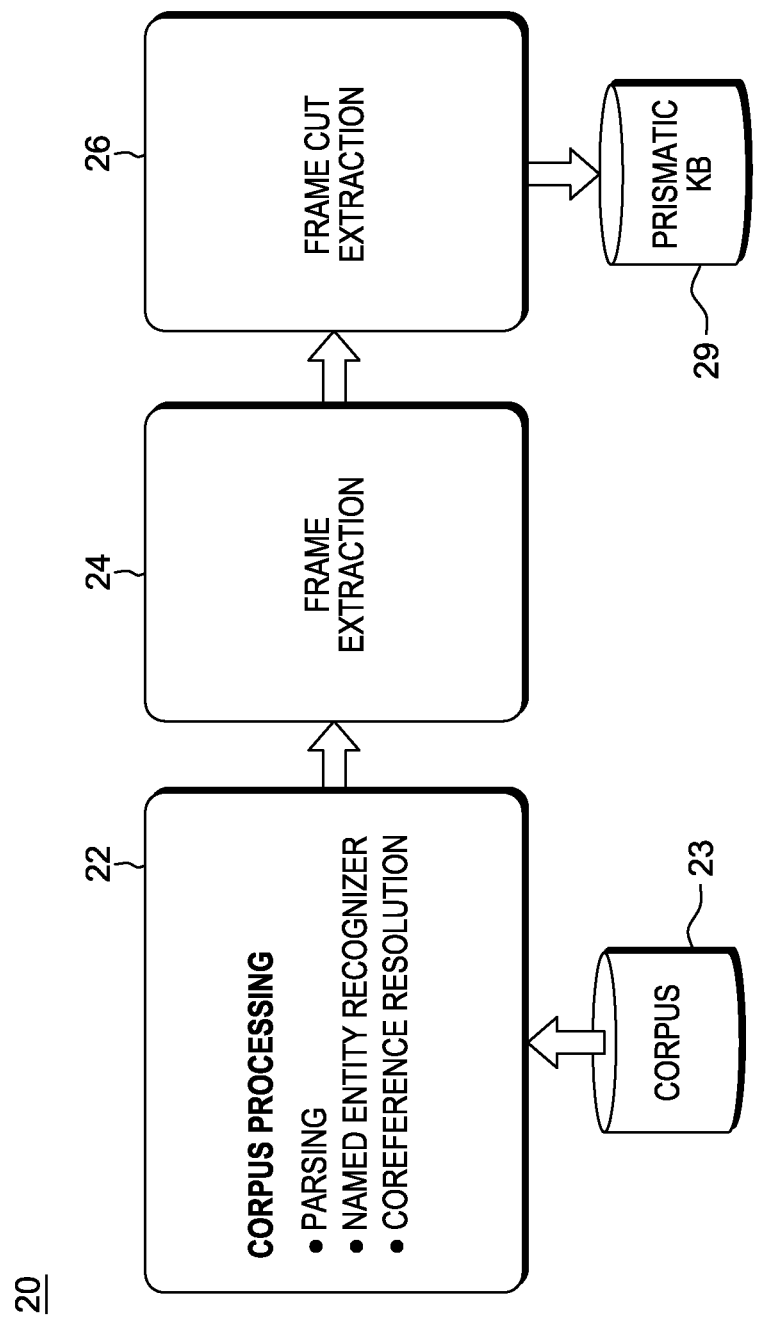
FIG. 2 depicts an overview of PRISMATIC knowledge base system processing in one embodiment.

An overview of PRISMATIC knowledge base system processing is now described in view of FIG. 2. PRISMATIC includes a knowledge base 29 that contains syntactic frames representing shallow knowledge extracted from a huge input corpus 23. It is built using a suite of natural language processing tools that includes a dependency parser, a rule-based Named Entity Recognizer (NER) and a co-reference resolution component. No manual intervention is required to adapt this workflow to specific domains. The PRISMATIC knowledge base 29 is used as a knowledge source by a large variety of components for answer generation, and passage scoring.

A frame in PRISMATIC is the basic semantic unit representing a set of entities and their relations in a piece of text (usually a sentence). A frame is made of a set of slot and value pairs. A slot in PRISMATIC is a dependency relation extracted from a parse tree. A slot value is the lemma of the term extracted from the dependency tree.

Referring to FIG. 2, the PRISMATIC system 20 processing pipeline includes three phases:

1. A corpus processing component 22 where documents from a data corpus or repository 23 are annotated by a suite of components which perform dependency parsing, co-reference resolution, named entity recognition and relation detection;
2. A frame extraction component 24 where frames are extracted based on the dependency parses and associated annotations; and,
3. A frame-cut extraction 26 where frame-cuts of interest (e.g. S-V-O cuts) are identified over all frames and frequency information for each cut is tabulated.

With respect to the corpus processing component 22, one step in the corpus processing is the application of a dependency parser which is used to identify the frame slots for the frame extraction component 24. In one embodiment, use is made of English Slot Grammar (ESG), a slot-grammar based parser, in order to fill in the frame slots. See M. McCord, "Using Slot Grammer," Mar. 24, 2010, incorporated herein by reference. Sentences frequently require co-reference in order to precisely identify the participating entity, and, so in order to not lose that information, there is applied a simple rule based co-reference resolution component in this phase. The co-reference information helps enhance the coverage of the frame-cuts, which is especially valuable in cases of sparse data and for use with complex frame-cuts.

A rule based Named Entity Recognizer (NER) is used to identify the types of arguments in all frame slot values. This type information is then registered in the frame extraction component 24 to construct intentional frames.

The frame extraction component 24 extracts a set of frames from the parsed corpus. As mentioned, a frame is the basic semantic unit representing a set of entities and their relations in a text snippet. A frame is made of a set of slot value pairs where the slots are dependency relations extracted from the parse and the values are the terms from the sentences or annotated types.

Figure 3:
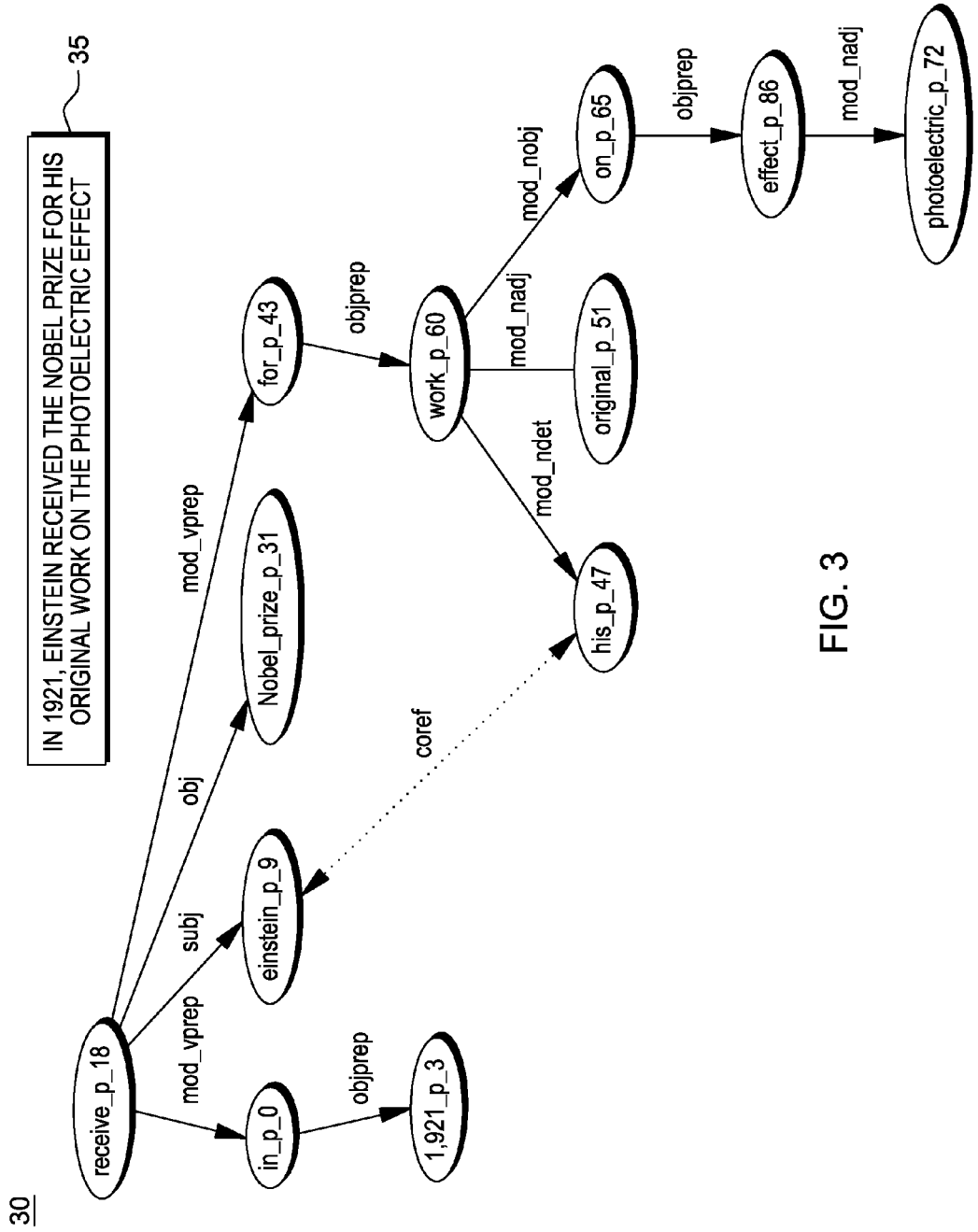
FIG. 3 shows a parse tree of a corresponding example sentence 35 for use in the generation of syntactic frames in one embodiment; for representing the example sentence.

The Tables 40 and 45 of FIG. 4 show how two frames (i.e., Frames 01 and 02) are extracted from a complex parse tree such as the tree 30 shown in FIG. 3. The tables 40, 45 shown in FIG. 4 depict the frames, extracted from an example parse tree 30 of the example sentence 35: "In 1921, Einstein received the Nobel Prize for his original work on the photoelectric effect."

In order to capture the relationship of interest, frame elements may be limited to those that represent the participant information of a predicate. Furthermore, in one embodiment, each frame may be restricted to be two levels deep; therefore, a large parse tree may result in multiple frames. Tables 40, 45 of FIG. 4 show how two frames are extracted from the complex parse tree in FIG. 3. For example, as shown, Frame 01 includes the value "Frame 02" corresponding to the slot objprep 41 extracted from the parse tree 30. The depth restriction is needed for two reasons. First, as big complex parse trees tend to have more wrong parses, by limiting a frame to be only a small subset of a complex parse tree, the chance of error parse in each frame is reduced. Second, by isolating a subtree, each frame focuses on the immediate participants of a predicate. Non-parser information may also be included in a frame. For example, the type annotations of a word from a named entity recognizer are included, and such type information is useful for other various applications. Also, in one embodiment, there is included a flag to indicate whether a word is a proper noun. These two kinds of information allow easily separation of the intensional and the extensional parts of PRISMATIC.

One of the main reasons for extracting a large amount of frame data from a corpus is to induce interesting knowledge patterns by exploiting redundancy in the data. For example, it may be desirable to learn that things that are "annexed" are typically regions, i.e., a predominant object-type for the nounphrase "annexation of " is "Region" where "Region" is annotated by a NER. To do this kind of knowledge induction, there is first abstracted out specific portions of the frame—in this particular case, to isolate and analyze the noun-phrase object-type relationship. Then, given a lot of data, and frames containing only the above relationship, it is expected to see the frame [noun="annexation", preposition="of", object-type="Region"] occur very frequently.

To enable this induction analysis, there is defined frame-cuts, which specify a cut or slice operation on a frame. For example, there is defined an N-POT frame cut, which when applied to a frame only keeps the noun (N), preposition (P) and object-type (OT) slots, and discards the rest. Similarly, there is defined frame-cuts such as S-V-O, S-V-O-IO, S-V-P-O etc. (where S—subject, V—verb, O—object, IO—indirect object) which all dissect frames along different dimensions. Continuing with the annexation example, the V-OT frame cut can be used to learn that a predominant object-type for the verb "annex" is also "Region", by seeing lots of frames of the form [verb="annex", object-type="Region"] in the data. To make frame-cuts more flexible, they are enabled to specify optional value constraints for slots. For example, defining an S-V-O frame cut, where both the subject (S) and object (O) slot values are constrained to be proper nouns, thereby creating strictly extensional frames, i.e. frames containing data about instances, e.g., [subject="United States" verb="annex" object="Texas"]. The opposite effect is achieved by constraining S and O slot values to common nouns, creating intensional frames such as [subject="Political-Entity" verb="annex" object="Region"]. The separation of extensional from intensional frame information is desirable, both from a knowledge understanding and an applications perspective, e.g., the former can be used to provide factual evidence in tasks such as question answering, while the latter can be used to learn entailment rules as seen in the annexation case.

A special frame cut used in PRISMATIC for capturing entity type knowledge is N-ISA (where N=noun). To capture this frame cut, there is built a rule-based recognizer of is_a relations based on a relatively small number of precise and productive patterns, such as in the tradition described in the paper, Hearst, "Automatic acquisition of hyponyms from large text corpora" *Proceedings of COLING*, 1992, incorporate herein by reference. This may be aided by a state-of-theart parser device, which can correctly identify appropriate syntactic configurations and pinpoint pattern elements as eventual arguments.

The PRISMATIC resource is augmented to include is_a relations obtained as part of the corpus processing step. Consequently, the frames extracted from the corpus can include is_a relation as well. The is_a relation is usually annotated between two nouns to indicate that the first noun is of the type denoted by the second noun.

In one embodiment, semantic types can be captured by looking at term occurrences in the context of syntactic frames. For example, if a term is very often the object of a live_in relation, most likely it will be a geopolitical entity, on the other hand, if it is its subject it can be expected to be a person. To be independent of a particular type system, there is developed a technique which is able to handle a potentially unlimited number of types. To this aim, there is used a generalized framework for textual inference based on PRISMATIC, namely the Generalized Frame Model (GFM), which is able to deal with type abstraction, paraphrasing and shallow logical inference in an unsupervised manner.

The GFM is inspired by the notion of Domain Model, a general framework based on latent semantic analysis (LSA) to represent topicality in lexical semantics and therefore boosting applications like Word Sense Disambiguation, Text Categorization, and so on. Described in more detail in Alfio Gliozzo and Carlo Strapparava, "Semantic Domains in Computational Linguistics", Springer, 2009, incorporate herein by reference. In the LSA literature, similarity is modeled by looking at term co-occurrences in documents in order to represent words and texts into lowed dimensional spaces where geometrical operations can be performed.

The GFM is based on the same intuition, the main difference being that it handles structured knowledge represented in PRISMATIC instead of simpler term by document matrixes, increasing the expressivity of the model and the capabilities that can be implemented. Therefore, it is capable of going beyond the recognition of mere topical associations (e.g. physician is similar to hospital and not to person) addressing issues like type typing (e.g. physician is similar to person but not to hospital), entailment (e.g. killing somebody entails that somebody die) and paraphrasing (invading and attacking are paraphrases in the war frame), frame similarity (e.g. attacking Iraq is similar to invading a country but not to studying in Bagdad). This is done by representing frames by a set(s) of other frames (and therefore properties) and not only by set of co-occurring words/documents.

The GFM, its mathematical foundations, and the lambda abstractions allowing for generation of Frame Vectors (FVs) where similarity can be estimated, is now provided below.

The PRISMATIC KB 29 is a collection of (frequently repeated) frame occurrences identified in a large corpus of text, i.e. P={$f_1, \ldots, f_z$}. As mentioned, its values are terms and its slots are syntactic roles identified by a dependency parser. It is understood that nothing prevents the application of PRISMATIC and the formalism described herein to other sources of structured data, such as linked data expressed in a Resource Description Framework (RDF) and databases.

A frame $f_i=[s_1=v_1 \ldots s_n=v_n]$ is organized around a set of slots S={$s_1, \ldots, s_k$} and values. In one embodiment, frames can be eventually composed by a single slot value pair (e.g. [noun=laptop]) which is one example formalism used to represent terms in the corpus.

The notation V(s, f)=v is used to denote the value of the slot s in the frame f. If this slot is missing then V(s, f)=ϵ. V(s)= $\cup_{f \in P}$V(s, f) is the vocabulary of a slot s, i.e., the set of all possible slot values as found in the corpus. For example, the frame f=[subj=carpenter, verb=use, obj=hammer] is a syntactic frame recognized by a dependency parser having slots subj, verb and obj where V (subj, f)=carpenter, V (verb, f)=use and V (obj, f)=hammer.

The frequency # (f) of a frame f is defined as follows:

$$\#(f)=|\{f_i \in P | \forall_{s \in S}(V(s,f)=V(s,f_i))\}| \quad (1)$$

A PRISMATIC cut C⊆P is a subset of frames having non-empty slot values for a given subset of slots $S_C$⊆S and empty slots for all the remaining.

$$C=\{f \in P | (\forall_{s \in S_C} V(s,f) \neq \epsilon) \wedge (\forall_{s \in S-S_C} V(s,f)=\epsilon)\} \quad (2)$$

For example the SVO cut $C_{svo}$, characterized by the slots {subj,verb,obj} includes all frames having non null values for any of the selected slots (e.g., [subj=president, verb=attack, obj=state]).

Prismatic cuts define highly dimensional vectorial spaces where any frame in the cut is a different dimension. Those spaces are used to represent frames (belonging to disjoint cuts) by means of Frame Vectors (FV), examples of which are illustrated in FIG. 5. FIG. 5 represents a FV space 50 of frame vectors of rabbit 51, snail 53 and person 55 from the perspective of the verbs they can be subject_of (i.e., the dimensions of this space are the vectors: verb=[run] 52, verb=[eat] 54 and verb=[read] 56). In one embodiment, from this new space 50, similarity can be estimated, e.g., by cosine operation, or other similarity measures.

FVs are generated by performing lambdaabstractions, defined as follows:

$$\lambda_C f = \overline{\{\langle f_i, w(f, f_i) \rangle \mid f_i \in C\}} \quad (3)$$

where $$w(f, f_i) = \sum_{f' \in P} \#(f')$$

and $$(\forall_{s \in S-S_C} V(s, f) = V(s, f')) \wedge (\forall_{s \in S_C} V(s, f') = V(s, f_i))$$

In equation (3), the operator $\overline{x}$ is used to normalize vectors to unitary length and it is defined as follows:

$$\overline{x} = \frac{x}{|x|}$$

where |x| is the norm of the vector x.

In one embodiment, the similarity between FVs is then estimated by a similarity measure, e.g., the dot product:

$$sim_c(f_1, f_2) = \lambda_c f_1 \cdot \lambda_c f_2 \quad (4)$$

where the dot product between normalized vectors is equivalent to a cosine and returns values in the range [0,1] if all the components of the compared vectors have positive values, which is the case in the GFM.

Figure 6:
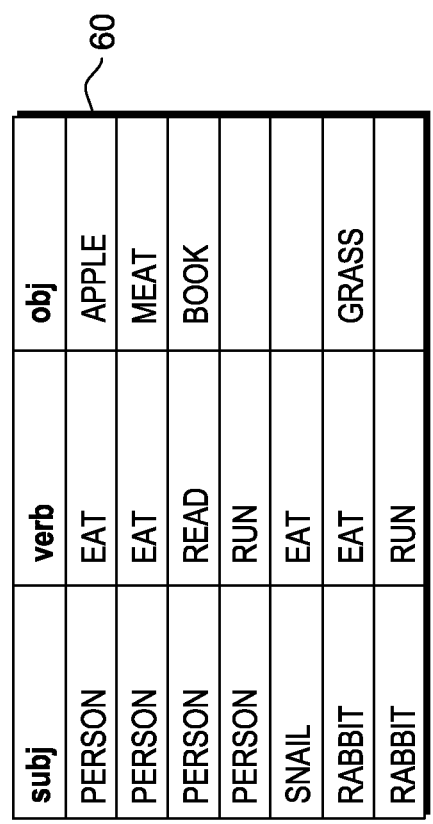
FIG. 6 shows example Prismatic Frames of a PRISMATIC cut 60 described by the table shown in an example implementation.

For example, the abstraction $\lambda_{verb}$[subj=person] generates the FV<([verb=eat],2/√6)([verb=read],1/√6)([verb=run],1/√6)> when applied to the PRISMATIC cut 60 described by the table shown in FIG. 6, while $\lambda_{verb}$[subj=snail] generates the FV<([verb=eat],1)> and $\lambda_{verb}$[subj=rabbit] generates the FV<([verb=eat], 1/√2)([verb=run],1/√2). This allows the method to estimate the similarity between them by means of the cosine operation returning $sim_v$([subj=snail], [subj=rabbit])=1/√2, $sim_v$([subj=person],[subj=snail])=1/√6 and so on.

Lambda abstractions can be used to define the meaning of predicates, terms, verbs and frames, which can all be represented by a frame structure. For example, the abstraction $\lambda_{subj}$[verb=use, obj=hammer] represents the prototypical subjects for the predicate (e.g. carpenter, mason, ... ). FVs can be therefore used to describe the meaning of predicates (e.g. $\lambda_{subj}$[verb=use,object=hammer], categories (e.g. $\lambda_{noun}$[isa=tool]), and so on. In addition, lambda abstractions can be performed on many arguments (e.g. $\lambda_{subj,verb}$[obj=hammer] has components [subj=carpenter, verb=use], [subj=mason, verb=buy] and so on).

In one embodiment of a Question Answering system, the GFM is integrated with Latent Semantic Analysis (LSA) to increase the expressivity of the query language. Taking into account Topic modeling, i.e., co-occurrence information that can be captured by "bag of words" or Latent Semantic Analysis, greatly improves this ability. For example in the question:

This drug has been shown to relieve the symptoms of ADD with relatively few side effects ... , the lambda abstraction $\lambda_{subj}$[verb=have, obj=effect] is generating the frame vector containing change, drug, decision, action, law. In the medical domain, only the subject drug is relevant, while the others are misleading.

Therefore LSA is integrated in the model in order to take into account topicality, defining the following weighting schema for Lambda Abstractions as follows:

$$\lambda_C(f, Q) = \overline{\{\langle f_i, w(f, f_i)\rangle\} \mid f_i \in C\}} \quad (5)$$

where $$w(f, f_i) = \sum_{f' \in P} \#(f') * \cos\left(\sum_{s \in C} LSA(V(s, f_i)), LSA(Q)\right)$$

The function LSA( ) maps any text into its LSA vector and allows one to measure the topical proximity by use of a similarity measure, e.g., the cosine operation. In one embodiment, it is applied to measure the similarity between the question Q and any frame in the cut C where the output vector is represented. Details regarding this functinal aspect may be found and described in Deerwester, et.al., "Indexing by Latent Semantic Analysis", Journal of the American Society for Information Science, v 41, pg 391-407, herein incorporated by reference. The resulting FV are then projected into a vectorial space distorted by the context where the frame is located. It allows one to give an higher weight to "on topic" frames, while reducing the impact of "out of topic" frames.

In one embodiment, LSA is implemented by applying a Singular Value Decomposition (SVD) on a term by document matrix obtained from Wikipedia (approximately 3M×3M size) and by using 400 dimensions. Using LSA for the above example question, the algorithm correctly finds drug as the topically relevant term given the context.

An embodiment of another technique for predicting LATs evaluated is now described.

In one embodiment, the Generalized Frame Model can be used for type abstraction if applied to the ISA cut as described herein above. For example, a term dog can be represented by a vector of types using the abstraction:

$\lambda_{isa}$[noun=dog]=<([isa=dog],0.80)([isa=animal],0.37)
  ([isa=pet],0.19) ... >.

Any lambda abstraction involving a single slot can be projected on to a set of types as follows:

$$\lambda_s^T f = \overline{\sum_{t \in V(s)} w(\lambda_s f, [s = t]) \lambda_{isa}[\text{noun} = t]} \quad (6)$$

where $$w(\lambda_C f, f') = \lambda_C f \cdot \langle (f', 1) \rangle$$

is a function projecting the vector $\lambda_C f$ into the component f', therefore returning the weight for that component.

Similarly, type abstraction can be applied to the output of Topical Lambda Abstraction as follows:

$$\lambda_s^T(f, Q) = \overline{\sum_{t \in V(s)} w(\lambda_s(f, Q), [s = t]) \lambda_{isa}[\text{noun} = t]} \quad (7)$$

This operation is crucial for type abstraction, as it allows to find a set of sectional restrictions for the abstracted slot in a specific frame, the resulting vector being a Type Vector representing a set of prototypical types. For example $\lambda_{subj}^T$[verb=attack,obj=Iraq]=<([isa=president],0.5) ([isa=country],0.3) .... This operation is general and can be applied to any cut and any slot value. In fact, the ISA cut represents associations between terms and their lexical types, so they can be applied to any slot in Prismatic regardless of the particular functions. Generally, type abstraction is applied to slots representing nouns such as subj and obj.

In one embodiment, a type abstraction is used to predict the LAT of questions. The basic idea is that a question Q is decomposed into a set of frames paired with corresponding focus slots Q=$(f_1,s_1), \ldots (f_q,s_q)$ where the focus is supposed to be a common entity filling any of the target slots. In one embodiment, the Frame Vector generated from Prismatic for any of the frames will generate a set of plausible "slot fillers" of the same type of the answer. This allows the application of equation (6) to get a set of possible types for any of them, obtaining the following:

$$LAT(Q) = \overline{\sum_{i=1...q} \lambda_{s_i}^T f_i} \quad (8)$$

Finally, the ISA cut information is integrated with LSA topical similarity from equation (7) to predict the LAT of a question:

$$LAT(Q) = \overline{\sum_{i=1...q} \lambda_{s_i}^T(f_i, Q)} \quad (9)$$

Thus, in one aspect, equations 8 and 9 involve processes implemented to just sum up the types generated by different Frames identified in the question.

Figure 7:
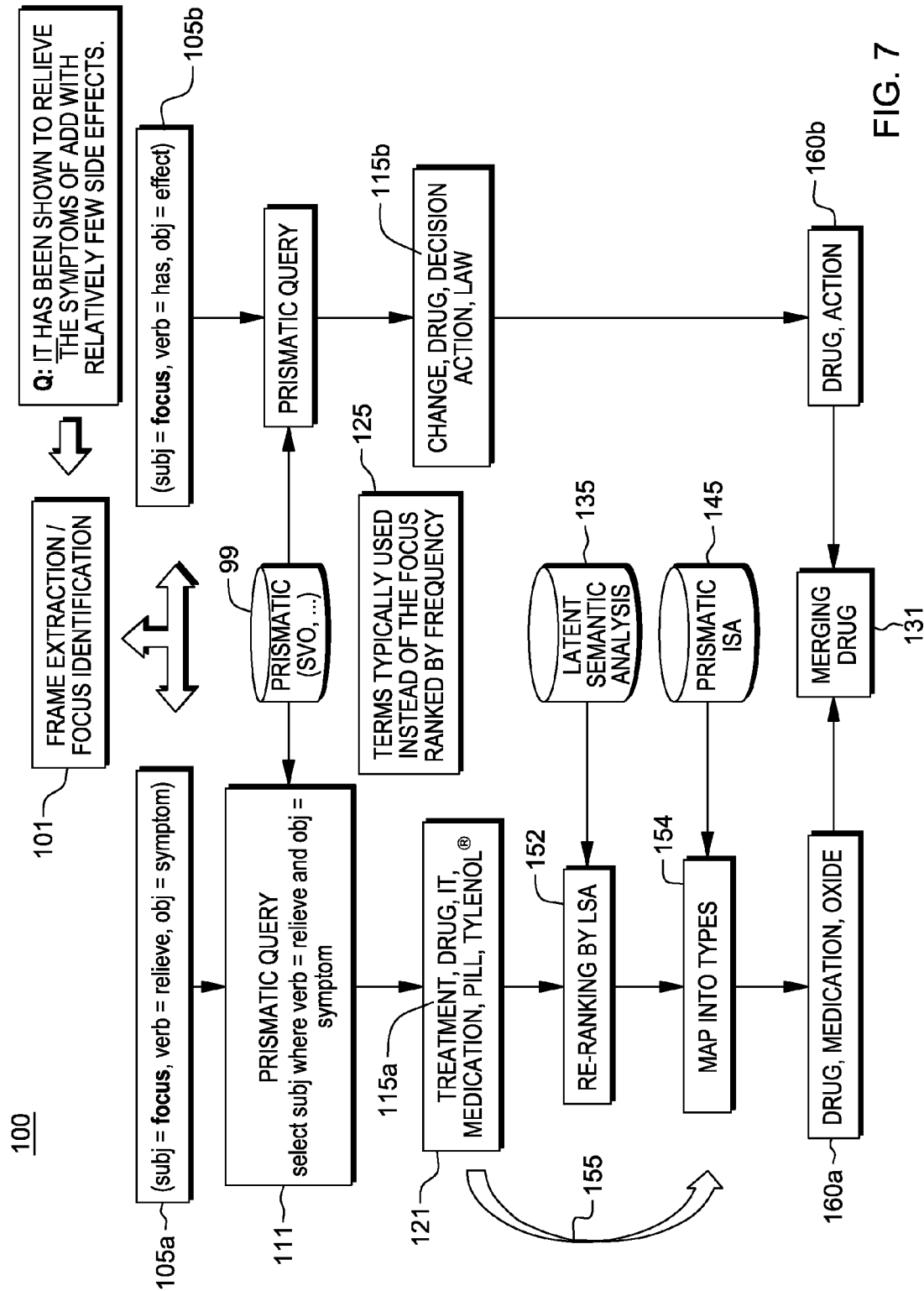
FIG. 7 illustrates an exemplary LAT inference system and method 100 in one embodiment.

By way of an example, a LAT inference system 100 and methodology for LAT inference is now described with respect to FIG. 7. The method 100 tries to find the most appropriate type/concept fillers for the FOCUS slot using information in PRISMATIC. The LAT inference algorithm also has a parameter that lets it consider the question text as context. In this case, it filters the predicted LATs by LSA-based topic similarity with the context. Given an input question, the LAT inference algorithm performs:
1. Applying a frame-extraction utility to the question text to identify all frames involving the focus of the question.
2. For each such frame detected, replacing the focus slot with a variable, creating a PRISMATIC query frame.
3. Perform LAT prediction on each query frame (i.e. finds slot fillers for the variable) using the question text optionally as context.
4. Aggregating scores for predicted LATs across all frames at the end.

Thus, as shown in FIG. 7, for the example question comprising:
It has been shown to relieve the symptoms of ADD with relatively few side effects.
the LAT inference algorithm performs, at 101, parsing of the question text to generate a set of frames (including S-V-O or other PRISMATIC structures) and identifying a focus slot. That is, in this example, the parser analyzes the query text and extracts a question focus, "It". The parser then generates from this example question one or more frames, and for the example shown, generates two PRISMATIC query frames having a slot with the focus, "It".

Then at 111, FIG. 7, for each such frame detected, there is performed replacing the focus slot ("It") with a variable, e.g., focus. This results in the generation of a PRISMATIC query frame 105a including PRISMATIC (subj=focus, verb=relieve, obj=symptom) frame structure, and PRISMATIC query frame 105b including PRISMATIC (subj=focus, verb=has, obj=effect) structure.

Then, at 121, FIG. 7, for this example, a PRISMATIC information query is performed against an accessible PRISMATIC corpus 99 (or like corpus of frames) to analyze the PRISMATIC collection of frames for LAT prediction. That is, on each query frame 105a, 105b, the method finds the focus slot filler for the variable. In one aspect, the question text is optionally used to provide a context.

Thus, as shown at 121, FIG. 7, for each example frame 105a, 105b, the frame corpus search conducted selects one of the "Subject" focus variable word(s) where there is matched remaining SVO attributes, i.e., where verb=relieve, object=symptom for frame 105a and, where verb=has, object=effect for frame 105b. Results of this frame search, for example, frame 105a would provide example slot words 115a including Treatment, drug, it, medication, pill, Tylenol® (Registered Trademark of The Tylenol company) (things that relieve symptoms), for example; and results of frame search for example frame 105b would provide example slot words 115b including change, drug, decision, action, law (e.g., things that have an effect).

More particularly, the LAT is inferred or predicted using the Generalized Frame Model described herein. Particularly, as shown at 155, FIG. 7, the system infers or predicts the LAT in one of several alternate implementations:
1) By using raw-frequency counts 125 (a baseline score) from the PRISMATIC KB which contains cuts for the input frame type. This is implemented by simple PRISMATIC queries on type $\lambda_s f_i$ as described by equation (6). That is, in one embodiment, the results of frame search within the PRISMATIC corpus 99 additionally provides a frequency of the focus words found in each frame (how frequent the words appear in the givent frame context). In one embodiment, a candidate inferred LAT is the result (focus) word having the largest frequency.
2) By using Latent Semantic Analysis (LSA) functions 135 to filter results of step 111 by computing the similarity between the LAT slot filler and the question text and discarding any slot-filler whose similarity is below a threshold value (e.g., 0.05). This is implemented by using $\lambda_s(f, Q)$ as described by equation (7). For the given example, it is expected that from the LSA method, the result slot variable filler words found such as treatment or drug found from analysis of frame 105a will be more frequent than words action or law found from analysis of frame 105b.
3) By using the PRISMATIC ISA KB to generalize results obtained at step 111 and produce more meaningful types/concepts (as opposed to instances). In particular, for each LAT slot filler predicted at the end of step 111, its type is looked up in the ISA KB and the type returned as the new predicted LAT. This is implemented by using $\lambda_s^T(f, Q)$, described by equation (8).
4) By using a combined LSA\ISA technique where the PRISMATIC ISA KB is accessed to generalize results obtained at 111. This is implemented by $\lambda_{s,Q}^T f$ as described by Equation (9).

Then, at 121, FIG. 7, after obtaining an inferred LAT, e.g., using one of the four unsupervised techniques, the system performs one or more additional steps 155 including: re-ranking at 152 the slot filler word results found (e.g., after performing a LSA analysis), and, mapping the slot filler word results found to a LAT type at 154. Thus, for example, as a result of task 121, and the re-ranking and mapping steps 155, FIG. 7, the predicted word Types 160a corresponding to the initial example query frame 105a include the words: Drug, medication, pill, Tylenol®. Likewise, as a result of task 121, given the context of the query, the predicted word Types 160b corresponding to the initial example query frame 105b include only the words: Drug, action.

Continuing with method 100 of FIG. 7, at 131, there is performed a further aggregating or merging in which the Type results 160a, 160b are compared to infer the final LAT type for the initial query. For the example query shown in FIG. 7, based on the example candidate LAT types 160a, 160b, the final predicted LAT type for the query would be the word Drug.

In one example scenario in which simple PRISMATIC queries on type $\lambda_s f_i$ as described by equation (6) is implemented, the method "projects" the list of terms returned by step 111 (i.e. prismatic queries using syntactic frames in the question) into a set of types (i.e., more general concepts, or words which are lexical answer types). To this aim the ISA database in PRISMATIC may be used for reporting associations as follows in the example:
Tylenol®->drug
Tylenol®->medication
Tylenol®->object
pill->drug
pill->substance As there may be multiples of those associations mined from large corpora in PRISMATIC KB, the system can handle many different questions in different domains.

Thus, for each term generated by step 111, the vectors returning their types are generated and summed up, and weighted by a probability score (obtained prior via PRISMATIC KB). For example, if the output of step 111 is: Tylenol®, pill, the following vectors may be generated:
Drug, medication, object
Drug, substance,
They are summed up, resulting in a vector promoting Drug as the predominant type.
Drug 2, medication 1, object 1, substance 1

It is understood that PRISMATIC queries on type $\lambda_s(f_i, Q)$ as described by equation (7) is similar with the only difference being that LSA weight "Q" is taken into account.

To adopt QA system technology to new domains requires a generalization effort and the development of unsupervised techniques as described herein that can be self trained by reading large amount of texts in the same domain. Contribution in this effort includes: the defining of LAT inference task for questions; and, the four (4) unsupervised techniques to address this task. All of these techniques do not require hand coded rules and do not use any ontology allowing easy portability across domains. Results on the LAT inference task are good, with high precision and recall in a coarse grained evaluation. In addition, a fine grained evaluation shows the ability to correctly subcategorize the target LAT in a substantial number of cases. A further contribution includes the Generalized Frame Model framework for handling similarity and type abstraction in lexical knowledge bases in a principled way; one contribution being the hybridization of LSA techniques with relational queries, showing significant improvements in type abstraction problem.

Further applications of the techniques herein include the integration of the LAT inference system in a Question Analysis component of a QA system architecture such as described in commonly-owned, co-pending U.S. patent application Ser. No. 12/126,642 entitled "SYSTEM AND METHOD FOR PROVIDING QUESTION AND ANSWERS WITH DEFERRED TYPE EVALUATION", incorporated by reference herein, to provide additional features for TyCor, Question Classification, and Soft Answer Filtering. This may be applied both to questions having a meaningful LAT (in order to improve the specificity of the LAT or find alternative ways to express the same concept), and to questions having a useless LAT where the highest headroom is expected. Secondly, a unified query language may be defined for the Generalized Frame Model to allow for hybridized structured and topical queries. Thus the framework may be applied to a large variety of tasks, including knowledge acquisition (and in particular learning selectional preferences and frame entailment) and textual entailment (and in particular lexical substitution, type abstraction, and paraphrasing).

By integrating the system and method herein in a QA system, machine processing is utilized for automatically answering questions that employs special processing steps in which an answer type is automatically inferred or predicted. In one embodiment, the results are automatically used in question answering whereby given an input LAT, an output is a judgment whether a candidate answer (entity) is an instance of a concept, e.g., by evaluating whether a thing, e.g., noun, or a word, or entity, is of or has the Lexical Answer Type specified.

Figure 8:
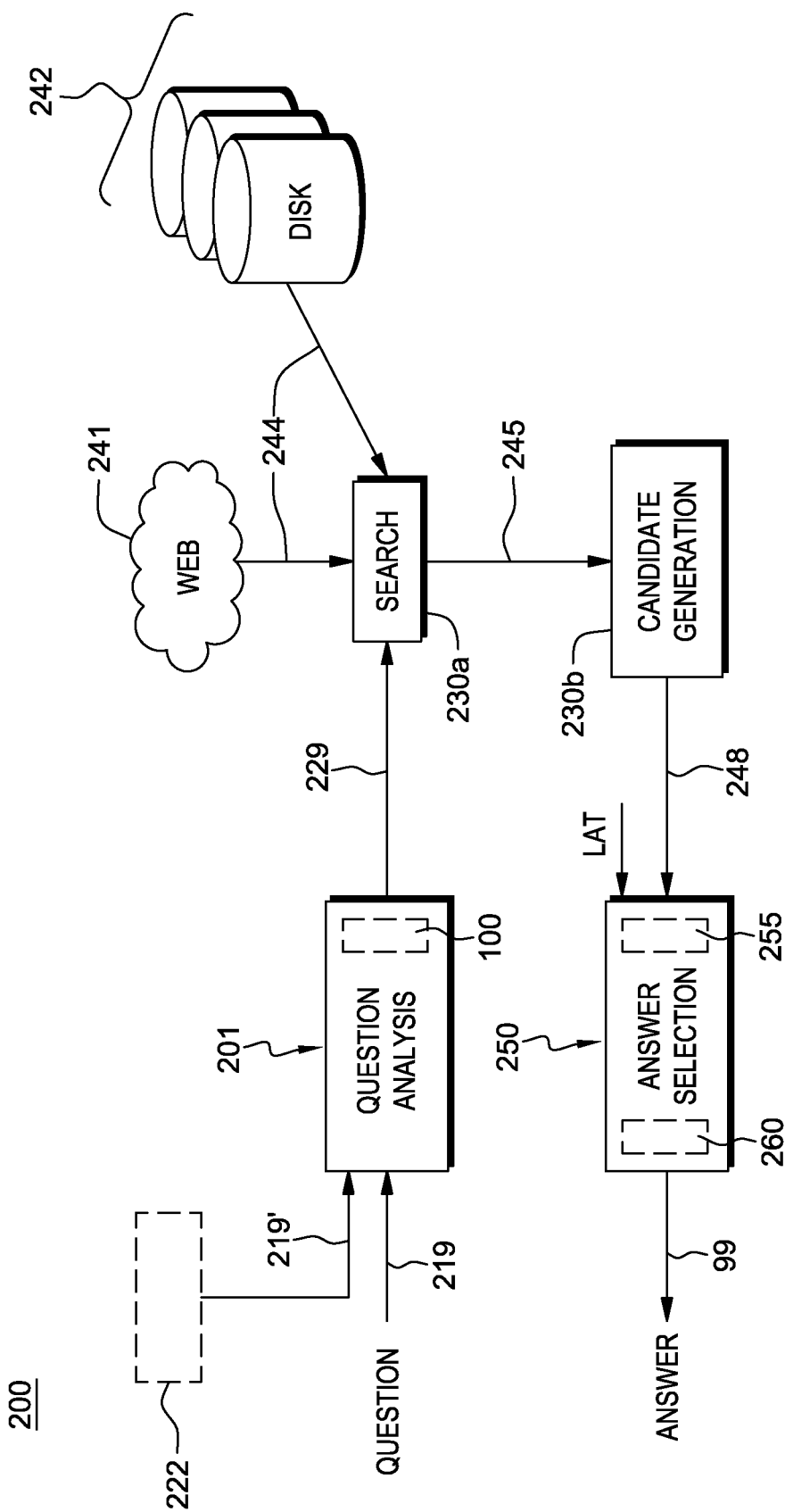
FIG. 8 illustrates the major components that comprise a canonical question answering system 200 in which the system 100 of FIG. 7 may be employed; and, FIG. 9 illustrates a hardware configuration to run method steps described with respect to FIG. 7.

FIG. 8 illustrates the major components that comprise an open domain canonical question answering (QA) system 200 and their workflow such as described in commonly-owned, co-pending U.S. patent application Ser. No. 12/126,642 entitled "SYSTEM AND METHOD FOR PROVIDING QUESTION AND ANSWERS WITH DEFERRED TYPE EVALUATION", incorporated by reference herein. In the high-level logical architecture 200 depicted, a question analysis component 201 receives a natural language question 219 (e.g., "Who is the 42$^{nd}$ president of the United States?"), and analyzes the question to produce, minimally, the semantic type of the expected answer 229 (in this example, "president"), and optionally other analysis results for downstream processing.

Generally, as shown in FIG. 8, the high level logical architecture 200 includes a Query Analysis module 201 implementing functions for receiving and analyzing a user query or question. The term "user" may refer to a person or persons interacting with the system, or refers to a computer system 222 generating a query by mechanical means, and where the term "user query" refers to such a mechanically generated query and context 219'.

The present system and method 100 depicted in FIG. 7 may be incorporated as part of Query Analysis module 201 processing, or is accessed to operate in conjunction with query analysis component to predict the LAT type from the input question. As shown in FIG. 8, a search component 230a formulates queries from the output 229 of question analysis and consults various resources such as the World Wide Web 241 or one or more knowledge resources, e.g., databases, knowledge bases 242, to retrieve "documents" including, e.g., whole documents or document portions 244, e.g., webpages, database tuples, etc., having "passages" that are relevant to answering the question. In one aspect, the candidate answer generation module 230 implements a search for candidate answers by traversing structured, semi structured and unstructured sources contained in primary sources (e.g., the Web, a data corpus 241) and in an Answer Source or a Knowledge Base (KB), e.g., containing collections of relations and lists extracted from primary sources. All the sources of information can be locally stored or distributed over a network, including the Internet.

The Candidate Answer generation module 230a of architecture 200 generates a plurality of output data structures containing candidate answers based upon the analysis of retrieved data. The candidate answer generation component 230b may then extract from the search results 245 potential (candidate) answers 248 to the question, which are then scored and ranked by the answer selection component 250 to produce a final ranked list of answers with associated confidence scores.

The answer selection component 250 includes an Evidence Gathering module that further interfaces with the primary sources and/or knowledge base for concurrently analyzing the evidence based on passages having candidate answers, and scores each of candidate answers, in one embodiment, as parallel processing operations. When the Search System 230a is employed in the context of a QA system 200, the Evidence Gathering and Scoring module 250 comprises a Candidate Answer Scoring module 255 for analyzing a retrieved passage and scoring each of candidate answers of a retrieved passage. One knowledge base includes an Answer Source Knowledge Base (KB) which may comprise one or more databases of structured or semi-structured sources (pre-computed or otherwise) comprising collections of relations (e.g., Typed Lists). In an example implementation, the Answer Source knowledge base may comprise a database stored in a memory storage system, e.g., a hard drive.

An Answer Ranking module 260 may be invoked to provide functionality for ranking candidate answers and determining a response 99 returned to a user via a user's computer display interface (not shown) or a computer system 222, where the response may be an answer, or an elaboration of a prior answer or request for clarification in response to a question—when a high quality answer to the question is not found. A machine learning implementation is further provided where the "answer ranking" module 260 includes a trained model component (not shown) produced using a machine learning techniques from prior data.

Figure 9:
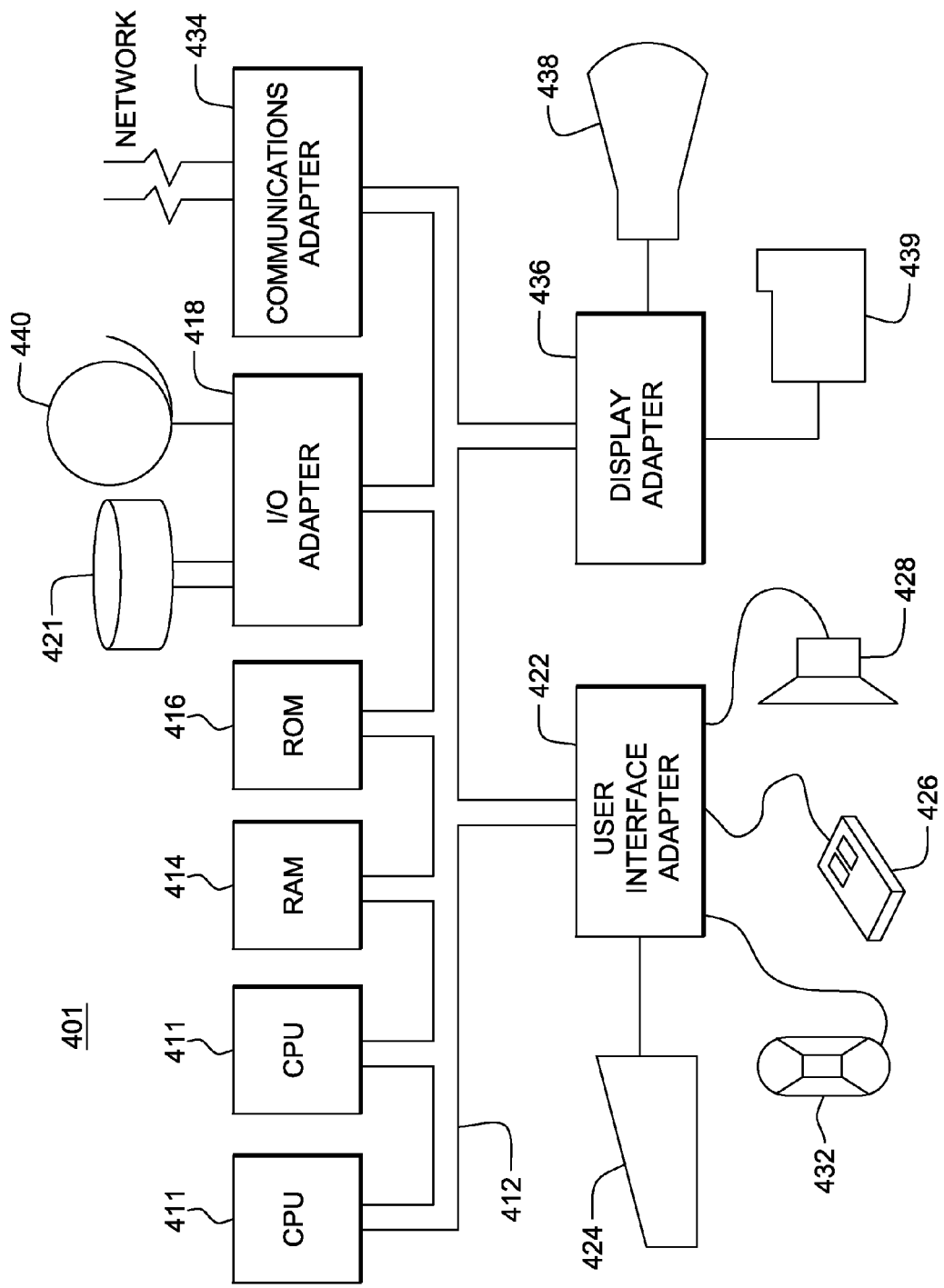

FIG. 9 illustrates an exemplary hardware configuration of a computing system 400 in which the present system and method may be employed. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more tangible computer readable medium(s) having computer readable program code embodied thereon.

Any combination of one or more computer readable medium(s) may be utilized. The tangible computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A computer-implemented method of inferring a lexical answer type from a question, said method comprising:
    extracting at least one syntactic frame from a question string;
    querying a lexical knowledge database to obtain at least one replacement term for a focus of said at least one syntactic frame, wherein said focus is a part of the question indicating a lexical answer type to the question,
    substituting at least one of said replacement terms with a generalized type information term using said database;
    ranking said replacement terms; and
    selecting a top-ranked replacement term as an inferred lexical answer type to said question.

2. The method according to claim 1, wherein said syntactic frames comprise terms selected from the group consisting of: a subject term; a verb term; an object term; and an indirect object term.

3. The method according to claim 1, wherein extracting a set of syntactic frames from a question string comprises:
    using a dependency parser to identify terms in a grammatical structure from said question string to be used as said extracted syntactic frame.

4. The method according to claim 1, wherein said lexical knowledge database comprises syntactic frames representing knowledge extracted from a corpus of data.

5. The method according to claim 1, wherein said entity type knowledge comprises frames having terms with is_a relationships.

6. The method according to claim 1, wherein querying said lexical knowledge database to obtain said at least one replacement term comprises:
    applying a Generalized Frame Model to obtain said at least one replacement term.

7. The method according to claim 1, further comprising:
    filtering out said replacement terms if said replacement term is not related to the context of said question.

8. The method according to claim 6, wherein said lexical knowledge database includes frame structures identified from a corpus of text, a frame structure having one or more slots-value pairs, a slot representing a syntactic role identified by a dependency relation, wherein said applying a Generalized Frame Model comprises:
    specifying a frame cut comprising a sub-set of frames having non-empty slot-values for a given subset of slot-values pairs;
    specifying a frame abstraction to determine a desired relationship among selected selected slot values from said given subset of slot-values pairs; and,
    generating, from said frame cut, plural frame vectors defining a multi-dimensional vector space from which relationships among selected selected slot values is determined,; and
    processing said frame vectors to determine said desired relationship among selected selected slot values as defined by said abstraction.

9. The method according to claim 7, wherein said desired relationship includes an inferred type of a slot representing one of: a syntactic subject role or syntactic object role in a corresponding verb and noun phrase.

10. A method for predicting a lexical answer types (LAT) in a question, the method comprising:
    applying a frame-extraction utility to a question text to identify all frames involving a question focus, each frame having one or more slots-value pairs with a slot representing a syntactic role identified by a dependency relation, and including a question focus slot;
    for each identified frame, creating a query frame structure having a focus slot variable, for each query frame structure, finding in a data corpus, a slot filler for the focus slot variable, said slot filler being part of a question focus from which said LAT is determined,
    obtaining a score associated with each said slot filler found for each identified frame
    ranking said slot fillers according to said scores; and
    selecting a top-ranked slot filler as a predicted LAT to said question,
    wherein a programmed processor device performs one or more of said applyuing, creating, finding, obtaining, ranking and selecting.

11. The method as in claim 10, wherein said data corpus includes frame structures identified from a corpus of text, a frame structure having one or more slots-value pairs, a slot representing a syntactic role identified by a dependency relation, said finding a slot filler comprising:
    specifying a frame cut comprising a sub-set of frames having non-empty slot-values for a given subset of slot-values pairs;
    specifying a frame abstraction to determine a desired relationship among selected selected slot values from said given subset of slot-values pairs; and,
    generating, from said frame cut, plural frame vectors defining a multi-dimensional vector space from which relationships among selected selected slot values is determined; and,
    processing said frame vectors to determine said desired relationship among selected selected slot values as defined by said abstraction.

12. The method as claimed in claim 11, wherein said desired relationship includes an inferred type for a slot filler of said focus slot representing one of: a syntactic subject role or syntactic object role in corresponding verb and noun phrases.

13. The method as claimed in claim 11, wherein said finding slot fillers for the focus slot variable comprises: tabulating raw-frequency counts of slot-fillers found from said frame cut.

14. The method as claimed in claim 11, wherein a specified frame cut includes an is_a frame cut including a sub-set of frames having is_a relationships representing associations between slot values and their lexical types, wherein, for each slot filler, said method comprising generating, a predicted LAT from said is_a frame cut.

15. The method as claimed in claim 11, wherein said finding slot fillers for the focus slot variable further comprises: filtering the slot filler results of predicted LATs by Latent Semantic Analysis (LSA)-based topic similarity with a context of said question.

16. The method as claimed in claim 15, wherein said filtering comprises:
    computing a similarity between said slot filler and the question text; and
    discarding any slot-filler whose similarity is below a threshold value.

17. The method as claimed in claim 14, further comprising:
    filtering the slot filler results of predicted LATs by Latent Semantic Analysis (LSA)-based topic similarity with a context of said question; and,
    for each slot filler, obtaining a predicted LAT from said is_a frame cut.

* * * * *